May 17, 1960

I. M. DAVIDSON 2,936,582

JET DEFLECTOR FOR A JET PROPELLED AIRCRAFT
COMPRISING A FLEXIBLE CANOPY

Filed June 10, 1955

Inventor
Ivor Macaulay Davidson
By
Stevens Davis Miller Mosher
his Attorneys

United States Patent Office 2,936,582
Patented May 17, 1960

2,936,582

JET DEFLECTOR FOR A JET PROPELLED AIRCRAFT COMPRISING A FLEXIBLE CANOPY

Ivor Macaulay Davidson, Farnborough, England, assignor to Power Jets (Research and Development) Limited, London, England, a British company Application June 10, 1955, Serial No. 514,675

Claims priority, application Great Britain June 18, 1954

3 Claims. (Cl. 60—35.54)

This invention relates to jet deflectors for jet propelled aircraft.

To reduce the length of runway necessary for landing jet propelled aircraft, and particularly aircraft designed for flight at high speeds, it is highly desirable to fit the aircraft with some form of jet deflector whereby the propulsive jet stream can be deflected from its normal rearward direction of discharge in such a manner that the forward thrust is reduced and in some cases reversed to decelerate the aircraft on the runway immediately after touchdown. Thus a deflector for smoothly deflecting the jet stream from the rearward direction to a sideways or forward direction is highly desirable. Various mechanical devices such as hinged shutters have been proposed for deflecting the jet outwardly from the rearwardly pointing jet pipe and then turning it into a direction having a forward component relative to the direction of flight. One such device is set forth in United State patent specification No. 2,637,164.

A highly desirable configuration of jet deflector is annular with an apex pointing into the centre of jet stream and a cross-section similar to that of an axi-symmetric Pelton wheel bucket. Such a form has hitherto been considered impractical because of weight and constructional difficulties including the problem of stowing the deflector when not in use and of moving it into position when required for use. An approximation to such a configuration, formed by hinged segments movable from a position in which they make up the walls of the jet pipe to one in which they make up a deflecting chute is described and illustrated in Figures 1 and 2 of said patent specification No. 2,637,164.

The present invention aims at providing a jet deflector which will deflect and in some cases reverse the direction of the jet stream smoothly and with minimum loss, and which can further be packed and stowed in a small space, and then brought into use, as readily as a braking parachute which is sometimes used for retarding an aircraft on landing.

Accordingly the invention provides a jet deflector for a jet propelled aircraft, which deflector is made of a flexible material and is such that it can be packed and stowed away when not in use and can be opened up to form a chute positioned and shaped to receive the jet stream from the jet nozzle of the aircraft and to deflect it from its normal rearward direction of discharge.

In a preferred form of the invention, the chute is constituted by a canopy of flexible material, e. g., metal cloth which may be secured to the aircraft structure and positioned relative to the jet nozzle by cords, the strands of which may also be of metal.

The canopy may be shaped to deflect the jet stream symmetrically on each side of an axial plane thereof, in which case it may be of said Pelton wheel bucket form as aforesaid. It may then be annular with its apex and its edges secured by the cords to the aircraft structure.

In order to overcome the difficulty in providing a satisfactory connection between the cords and the canopy, some at least of the threads of the cloth forming the canopy may be continued as strands of the cords.

One embodiment of the invention will now be described by way of example with reference to the accompanying drawings of which:

Figure 1:
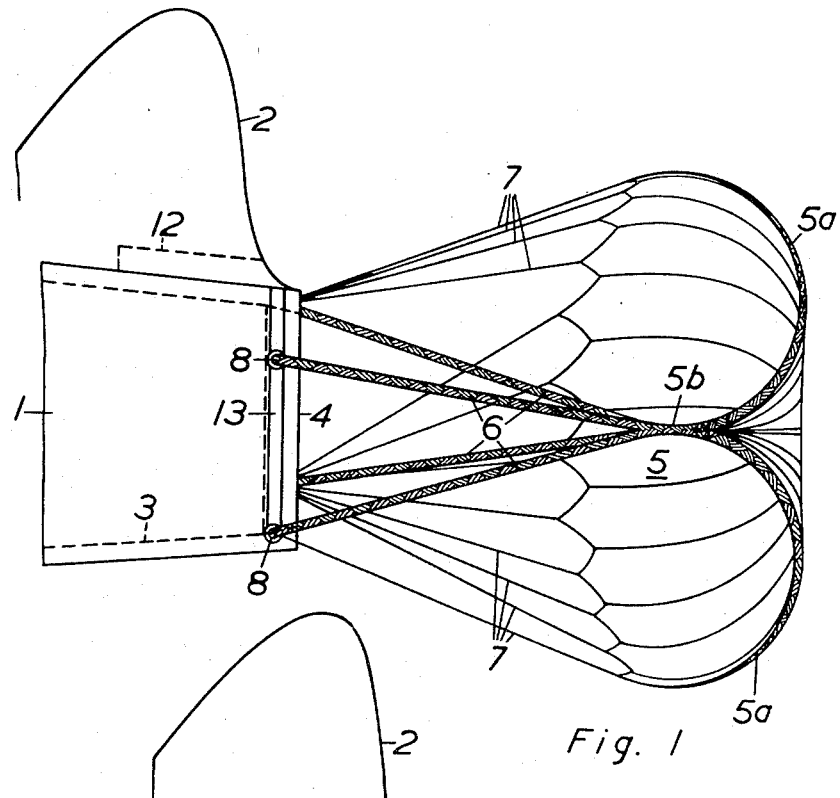
Figure 1 is a view of the rearward end of the fuselage of a jet propelled aircraft with the jet deflector in operation. The jet deflector itself is shown in axial section.
Figure 2:
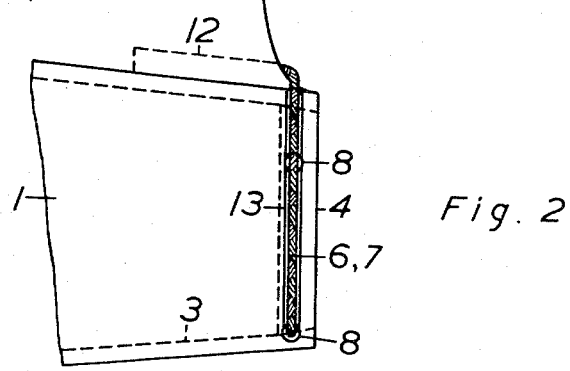
Figure 2 is a corresponding view with the jet deflector stowed.

In Figures 1 and 2 there is shown the rearward extremity of the fuselage 1 of an aircraft upon which is mounted the fin 2. The aircraft is powered by a gas turbine jet propulsion engine (not shown), the exhaust gases of which are discharged as a propulsive jet stream through a jet pipe 3 within the fuselage 1, terminating in a jet nozzle 4 which is of circular or substantially circular cross-section.

The aircraft is provided with a jet deflector which comprises a canopy 5 made of a flexible metal cloth secured to the aircraft fuselage by flexible metal cords 6, 7, the metal used being one capable of withstanding the temperature of the hot jet stream. The canopy is annular and in axial cross-section has two arcuate portions 5a which meet at an apex 5b pointing towards the jet nozzle. It is thus somewhat of the form of an axi-symmetric Pelton wheel bucket. The apex 5b is tied to four anchorages 8 on the fuselage 1 symmetrically disposed around the jet nozzle 4 by the four cords 6 while the peripheral edge of the canopy is tied to these same anchorages 8 by the cords 7 which are divided into four groups corresponding to the four anchorages.

It will be appreciated that there could be a different number of anchorages to that shown, and in some cases it might be more convenient to use separate anchorages for the central and peripheral cords 6, 7.

The cords 6 are all of the same length and they accordingly hold the apex 5b of the canopy in alignment with the axis of the jet stream. The peripheral cords 7 hold the edges of the canopy with the concave sides of arcuate portions 5a facing the jet nozzle, the canopy thus forming a chute which progressively deflects the jet stream symmetrically around and away from the jet stream axis, turns it through more than 90° and discharges it in a forward direction relative to the direction of flight of the aircraft.

In order that the canopy 5, when in operation, shall be laterally stable, it is so proportioned to turn the jet stream through an angle of more than 180°. To this end the outside diameter of the canopy is somewhat greater than, say twice, the nozzle diameter. If the apex 5b is displaced slightly from alignment with the jet stream axis, the resulting change in the distribution of the load on the canopy will produce a restoring force.

The total load on the canopy 5 and on the cords 6, 7 will be of the order of twice the jet thrust, and the attachments of the cords to the canopy must be such as to withstand these loads. It is a feature of the invention therefore that at least some of the metal threads in the cloth are continuous with the strands of the cords.

Figure 3:
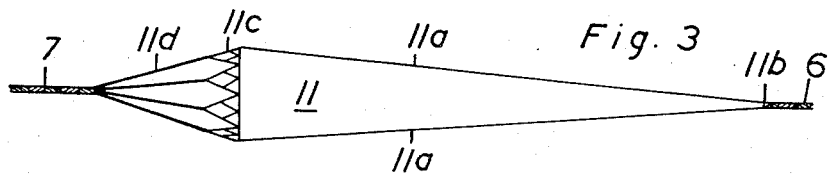
Figure 3 is a developed view of a panel of the jet deflector canopy.

In the embodiment illustrated, the canopy 5 is made of a considerable number of segmental panels 11, one of which is illustrated in Figure 3. The panels are sewn or otherwise joined together along their longer edges 11a so that their pointed ends 11b meet at the apex 5b of the canopy. The warp threads of the metal cloth are so arranged that they converge to the pointed end 11b, i.e. they extend radially from the apex to the periphery of the canopy. The warp threads of all the panels are merged i.e. twisted or braided together so that they form the strands of a single central tie rope at the apex of the canopy, which rope is divided after a short length into the four central cords 6.

At the other end of the panel, the warp threads are divided into eight groups and the threads of each group are merged to form a cord 11c. The eight cords 11c are in turn merged in pairs to form four cords 11d which are finally merged to form one of the peripheral cords 6. Accordingly the warp threads of the canopy are continued as strands of the cords 6 and 7 to the anchorages 8, i.e. they extend from the anchorages through the peripheral cords, the canopy and the central cords back to the anchorages. It is these warp threads which provide the strength of the jet deflector under load. Wires are available for use as the warp threads in alloys having adequate tensile strength at the temperatures involved.

The purpose of the weft threads of the panels of the canopy is to render it as impervious as possible, and in general the weft threads are not so highly stressed as the warp threads. Local reinforcements may be provided at the adjoining corners of the panels and elsewhere in the canopy as required.

The canopy 5 may be made up of two or more layers of metal cloth stitched or otherwise held loosely together. All the layers will be made up in panels with the warp threads running from the apex of the canopy to the periphery as already described and the warp threads of all the layers will be merged to form the central and peripheral cords 6, 7.

The grouping of the warp threads of each panel to form the peripheral cords 7 may be varied, e.g., they may initially be divided into a greater number of groups than that shown, and there may be a greater number of intermediate cords such as 11c and 11d before they are merged into the peripheral cord 7. In some cases there may be two or more peripheral cords for each panel. Thus in the case of two peripheral cords 7, each may be formed by merging two of the cords 11d. In another arrangement, each cord 7 may be formed by merging some of the warp threads from each of two adjacent panels, e.g. by merging two of cords 11d from each panel.

In some circumstances the canopy may be made up in one piece instead of from separate panels. Other methods of construction known in the making of parachutes, might also be used.

As shown in Figure 2, the canopy 5 is folded and packed before use in a housing 12 in the base of the fin 2, with the cords 6, 7 extending from the housing to the anchorages 8. The cords leading to the anchorages below the fuselage are wrapped around the fuselage in grooves or channels 13, so that they are protected from the airstream in flight.

On landing the aircraft, the canopy 5 is ejected from the housing 12 by a known ejector device, e.g. spring or cartridge operated, or by a pilot parachute, the engine being temporarily throttled to reduce the jet stream. The drag due to the forward motion of the aircraft opens up the canopy and tends to roughly centre it with respect to the jet nozzle 3. The engine is then opened up again, and the canopy reverses the jet stream to produce a reverse thrust on the aircraft.

The cords 6, 7 are secured to the anchorages 8 by fastenings of a known quick-release type, so that as soon as the aircraft comes to rest, the jet deflector can be detached from the aircraft by the ground crew to allow the aircraft to taxi away. In some cases an automatic or pilot operated release may be provided. The jet deflector may subsequently be repacked and replaced in the housing 12.

The jet loads on the canopy when the jet deflector is in operation are transmitted to the anchorages and to the fuselage which must accordingly be such as to be capable of withstanding any extra loads which this may involve.

In an alternative construction, the anchorages 8 may be on the jet pipe 3 which must then be reinforced.

The annular form of jet deflector described above is suitable for use with jet nozzles of which the transverse dimensions taken at right angles to one another do not differ very greatly. Thus it may be used with circular, square and polygonal nozzles even when their shapes are slightly varied by the presence of jet nozzle area control devices. If however, the nozzle is greatly elongated, the jet deflector must be correspondingly elongated, e.g., it may be elliptical instead of circular. In any case, however, its cross-section taken on plane normal to the plane of longer axis of the nozzle will be of the general form shown in Figure 1.

The invention has been herein described as applied to a jet deflector associated with a fuselage-mounted engine discharging through a jet nozzle at the rearward extremity of the fuselage, but it could equally well be used in conjunction with a wing-mounted engine enclosed by a nacelle. In this case, a streamlined housing will be provided on top of the nacelle in which the canopy may be stowed when not in use.

I claim:

1. An aircraft comprising a jet propulsion plant having a jet pipe terminating in a jet nozzle for the rearward discharge of a propulsive jet stream; anchorages on said aircraft; a jet deflector comprising a canopy made of flexible metal cloth and flexible cords made of metal strands attached at their ends to the canopy and to the anchorages; a canopy-receiving housing on said aircraft; said canopy being foldable and unfoldable so as to be capable of being packed and stowed in said housing and of being opened up to form a chute, an axial cross-section of which taken normal to a plane containing the axis of the jet stream is defined by two symmetrical arcuate portions meeting at one end on said plane at an apex and curving away from said plane one on each side thereof to edges at their other ends, and said cords being attached to the apex and to the edges of the chute and being such in relation to the position of the anchorages that when the canopy is in the housing they extend from the housing to the anchorages and when the canopy is opened up they position it with the apex pointing towards and aligned with the nozzle on said plane and the concave sides of the arcuate portions facing the jet stream and the edges spaced apart by a distance greater than the transverse dimension of the jet stream measured normal to said plane.

2. An aircraft comprising a jet propulsion plant having a jet pipe terminating in a jet nozzle for the rearward discharge of a propulsive jet stream; anchorages on said aircraft; a jet deflector comprising a canopy made of flexible metal cloth and flexible cords made of metal strands attached at their ends to the canopy and to the anchorages; a canopy-receiving housing on the aircraft; said canopy being foldable and unfoldable so as to be capable of being packed and stowed in said housing and of being opened up to form a chute, an axial cross-section of which taken normal to a plane containing the axis of the jet stream is defined by two symmetrical arcuate portions meeting at one end on said plane at an apex and curving away from said plane one on each side thereof to edges at their other ends, and said cords being attached to the apex and to the edges of the chute and being such in relation to the position of the anchorages that when the canopy is in the housing they extend from the housing to the anchorages and when the canopy is opened up they position it with the apex pointing towards and aligned with the nozzle on said plane and the concave sides of the arcuate portions facing the jet stream and the edges spaced apart by a distance greater than the transverse dimension of the jet stream measured normal to said plane, the cloth of the canopy including warp threads extending from the apex to the edges of the chute, which threads are continuous with at least some of said strands of said cords, and weft threads interwoven with said warp threads.

3. An aircraft according to claim 2 wherein the canopy comprises a plurality of layers of cloth, each layer including threads extending from the apex to the edges of the chute which threads are continuous with at least some of said strands of said cords.

References Cited in the file of this patent

UNITED STATES PATENTS

| | | |
|---|---|---|
| 1,746,862 | Martin | Feb. 11, 1930 |
| 2,304,306 | Hobbs | Dec. 8, 1942 |
| 2,358,417 | Quilter et al. | Sept. 19, 1944 |
| 2,486,403 | Hattan | Nov. 1, 1949 |
| 2,513,867 | Heffernan | July 4, 1950 |
| 2,525,844 | Weaver | Oct. 17, 1950 |
| 2,546,293 | Berliner | Mar. 27, 1951 |
| 2,603,062 | Weiler et al. | July 15, 1952 |
| 2,612,332 | Drozinski | Sept. 30, 1952 |
| 2,620,623 | Imbert | Dec. 9, 1952 |
| 2,729,409 | Hand | Jan. 3, 1956 |

FOREIGN PATENTS

| | | |
|---|---|---|
| 146,864 | Australia | June 18, 1952 |